United States Patent
Chan et al.

(10) Patent No.: US 8,345,546 B2
(45) Date of Patent: Jan. 1, 2013

(54) DYNAMIC MACHINE-TO-MACHINE COMMUNICATIONS AND SCHEDULING

(75) Inventors: Yee Sin Chan, San Jose, CA (US); Jin Yang, Orinda, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 251 days.

(21) Appl. No.: 12/834,985

(22) Filed: Jul. 13, 2010

(65) Prior Publication Data

US 2012/0017216 A1 Jan. 19, 2012

(51) Int. Cl.
*G01R 31/08* (2006.01)
(52) U.S. Cl. .......................... 370/229; 370/468
(58) Field of Classification Search .......... 370/229–234, 370/351–356, 468
See application file for complete search history.

(56) References Cited

U.S. PATENT DOCUMENTS

| | | | |
|---|---|---|---|
| 4,991,204 A * | 2/1991 | Yamamoto et al. ...... | 379/221.01 |
| 6,842,428 B2 * | 1/2005 | Chen et al. .................... | 370/252 |
| 7,274,666 B2 * | 9/2007 | Balakrishnan et al. ....... | 370/232 |
| 7,292,598 B2 * | 11/2007 | Ho et al. ....................... | 370/461 |
| 7,689,714 B1 * | 3/2010 | Zaumen ......................... | 709/241 |
| 2002/0110085 A1 * | 8/2002 | Ho et al. ....................... | 370/230 |
| 2009/0227261 A1 * | 9/2009 | Tiirola et al. ................. | 455/450 |
| 2012/0109393 A1 * | 5/2012 | Kosaka et al. ................ | 700/291 |

\* cited by examiner

*Primary Examiner* — Ricky Ngo
*Assistant Examiner* — Phuongchau B Nguyen

(57) ABSTRACT

A method may include obtaining traffic loading and resource utilization information associated with a network for the network time domain; obtaining machine-to-machine resource requirements for machine-to-machine tasks using the network; receiving a target resource utilization value indicative of a network resource limit for the network time domain; calculating a probability for assigning each machine-to-machine task to the network time domain, wherein the probability is based on a difference between the target resource utilization value and the traffic loading and resource utilization associated with the network; calculating a probability density function based on an independent and identically distributed random variable; generating a schedule of execution of the machine-to-machine tasks within the network time domain based on the probabilities associated with the machine-to-machine tasks and the probability density function; and providing the schedule of execution of the machine-to-machine tasks.

20 Claims, 16 Drawing Sheets

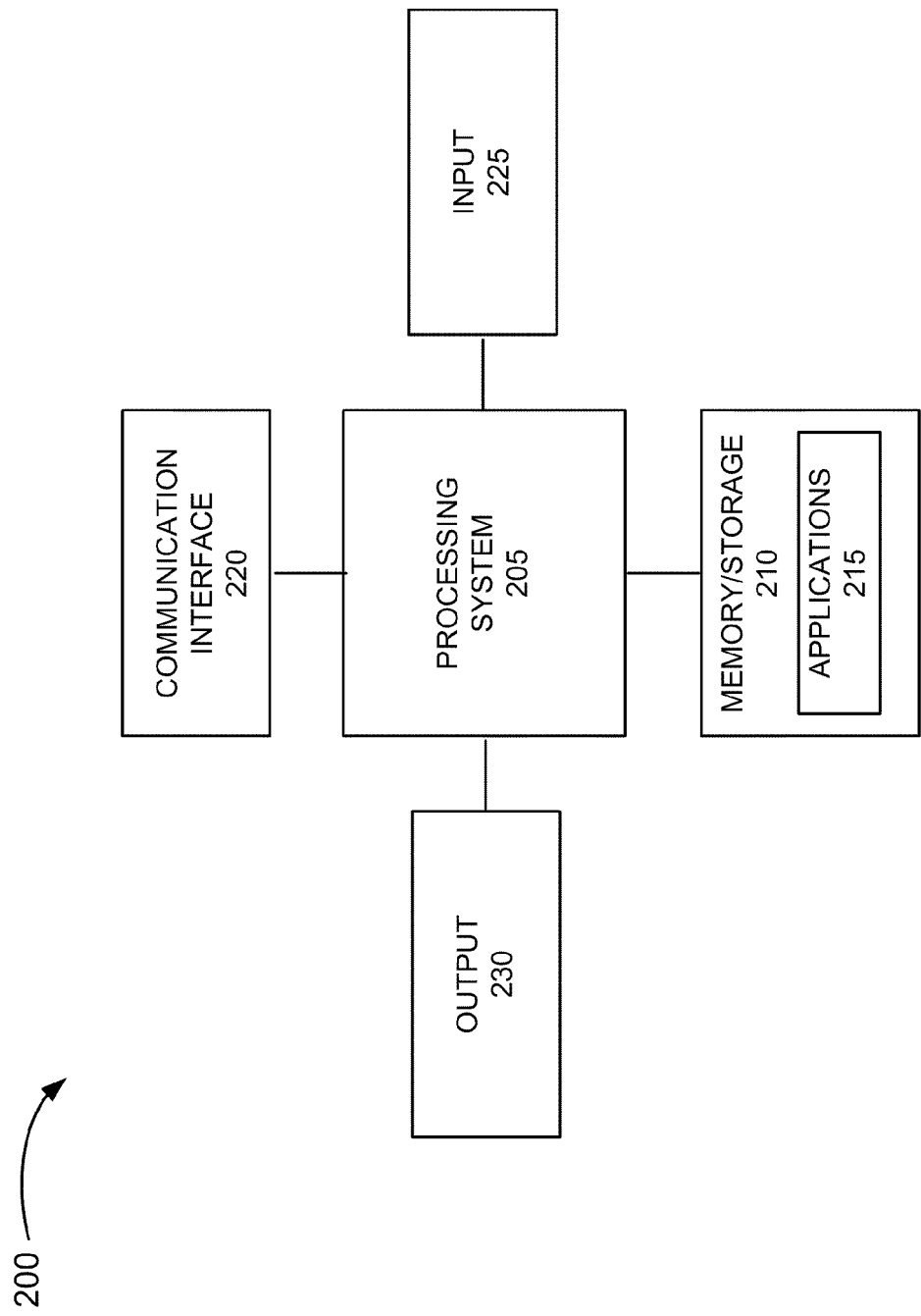

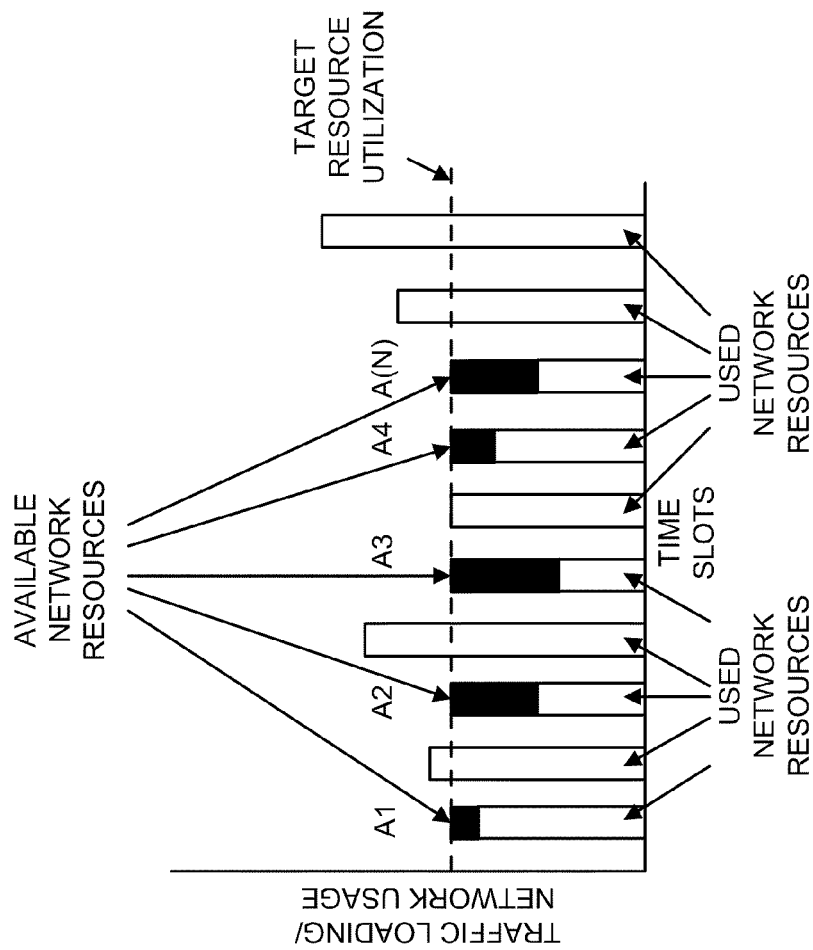
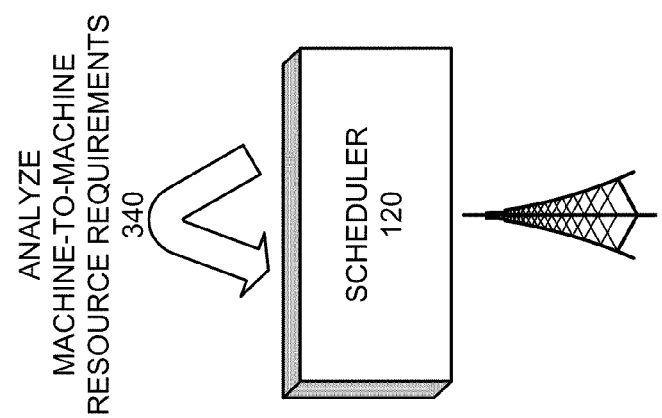
Fig. 3D

DYNAMIC MACHINE-TO-MACHINE COMMUNICATIONS AND SCHEDULING

BACKGROUND

Network resource allocation and utilization is a critical factor in any network. Given the expansive nature by which networks may be used, network operators need to manage these resources carefully to ensure quality of service and maintain other performance metrics. For example, machine-to-machine communications, such as, for example, utility monitoring, remote alarm system monitoring, vehicular telematics, vending machine monitoring (e.g., stock level checks), file back-up, etc., can consume network resources, in addition to other types of communications (e.g., voice communications, text communications, etc.).

BRIEF DESCRIPTION OF THE DRAWINGS

FIG. 2 is a diagram illustrating exemplary components of a device that may correspond to one or more of the devices in the environment depicted in FIGS. 1A-1G;

FIGS. 3A-3F are diagrams illustrating an exemplary process associated with single/multiple time-domain(s) water-filling-weighted pseudo-random task scheduling;

DETAILED DESCRIPTION OF PREFERRED EMBODIMENTS

Figure 1A:
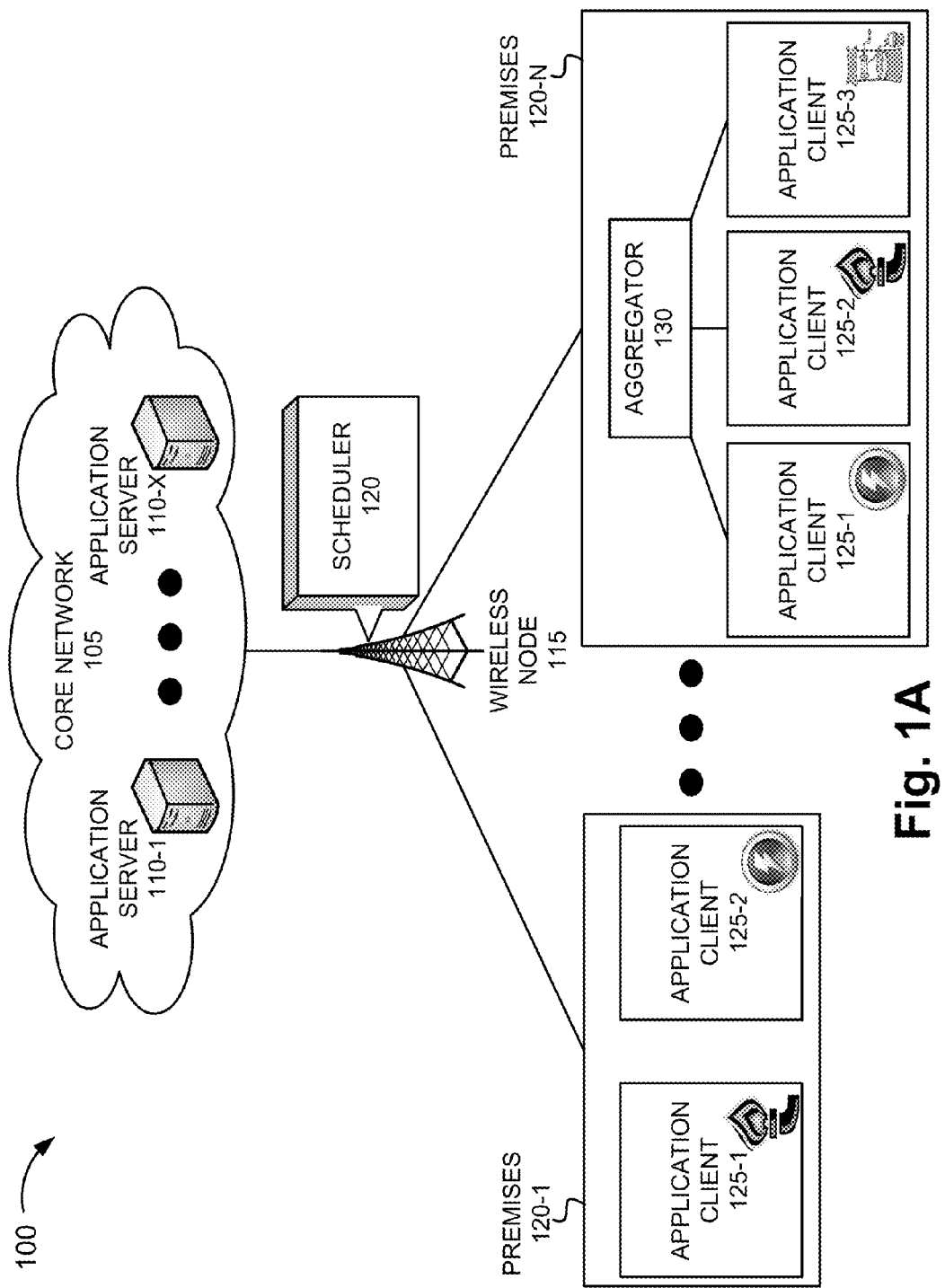
FIG. 1A is a diagram illustrating an exemplary environment in which an exemplary embodiment of a single/multiple time-domain(s) water-filling-weighted pseudo-random task scheduling may be implemented.

The following detailed description refers to the accompanying drawings. The same reference numbers in different drawings may identify the same or similar elements. Also, the following detailed description does not limit the invention.

According to an exemplary embodiment, pre-scheduled communications, such as, for example, machine-to-machine tasks (e.g., machine-to-machine communications), may be based on a single time-domain water-filling-weighted pseudo-random task scheduling process or multiple time-domains water-filling-weighted pseudo-random task scheduling process. According to an exemplary implementation, network resource requirements may be estimated for machine-to-machine tasks. For example, network resource requirements may relate to an end-to-end communication or a portion thereof (e.g., a single hop, multiple hops, etc.). Additionally, frequencies in which the machine-to-machine tasks are to be performed may be determined. For example, with reference to an automatic meter reading, the frequency may be once a month, weekly, daily or some other time period.

According to an exemplary implementation, statistical analysis may be performed to evaluate traffic loading and resource utilization of a network at one or multiple time domains. For example, one or multiple resource usage patterns (e.g., a monthly resource usage pattern, a weekly resource usage pattern, etc.) may be determined from historical data associated with the network. The time domain(s) may be divided into time divisions or time slots, such as, for example, hourly, half-hourly, etc. Traffic loading and resource utilization may be evaluated within the time divisions.

Further, according to an exemplary implementation, a target resource utilization of the network may be defined. The target resource utilization may correspond to a resource limit with which network resources may be utilized. The target resource utilization may be used to determine time slots that may be under-utilized and time slots that may be over-utilized. For example, in view of the target resource utilization, no machine-to-machine task(s) may be assigned to a time slot in which traffic loading/resource utilization is higher than the target resource utilization. Conversely, machine-to-machine task(s) may be assigned to a time slot in which traffic loading/resource utilization is lower than the target resource utilization.

According to an exemplary implementation, probabilities of assigning the machine-to-machine tasks to the time slots may be calculated. That is, the probability of assigning a machine-to-machine task with respect to each time slot may be calculated. The probabilities may be calculated based on the difference between the target resource utilization value(s) and the network usage(s) with respect to the time slots. According to such an implementation, the probability is calculated to be zero for time slots in which the network resource usage value(s) exceed the target resource utilization value(s).

According to an exemplary implementation, in view of the probabilities calculated, a probability density function (pdf) may be calculated. For example, a pseudo-random, uniformly distributed number generator may be used to calculate the pdf based on a random variable that is independent and identically distributed (iid). The pseudo-random, uniformly distributed number generator may assign the machine-to-machine tasks with probabilities equivalent to the probability distribution calculated. In other words, the pseudo-random, uniformly distributed number generator may be used to select a time slot to execute the machine-to-machine tasks and the probability of the time slot selected may correspond to the pdf calculated. According to such an exemplary implementation, machine-to-machine tasks assigned to particular time slots may be executed randomly. Additionally, the pseudo-random number generator with a uniform pdf may be used to randomize the execution of machine-to-machine tasks assigned to the same time slot. For example, if the time slot is hourly, the pseudo-random number generator with the uniform pdf may be used to assign the random execution of the machine-to-machine tasks based on smaller time values (e.g., minutes, seconds, a machine time (e.g., chips associated with Code Division Multiple Access (CDMA)), etc.).

FIG. 1A is a diagram illustrating an exemplary environment 100 in which an exemplary embodiment of a single/multiple time-domain(s) water-filling-weighted pseudo-random task scheduling process may be implemented. By way of example, environment 100 may include machine-to-machine devices related to providing/managing utility services, such as, for example, gas, water, and/or electric. According to other embodiments, environment 100 may include other types of machine-to-machine devices. As illustrated, environment 100 may include a core network 105 that includes application servers 110-1 through 110-X (referred to generally as application servers 110 or application server 110), a wireless node 115 that includes a scheduler 120, and premises 120-1 through 120-N (referred to generally as premises 120). According to an exemplary embodiment, premises 120 may include application clients 125. For example, premises 120-1 may include an application client 125-1 related to gas services and an application client 125-2 related to electric services (referred to generally as application clients 125 or application client 125). According to another exemplary embodiment, premises 120 may include an aggregator 130 and application clients 125. For example, premises 120-N may include aggregator 130, and an application client 125-1 related to electric services, an application client 125-2 related to gas services, and an application client 125-3 related to water services. According to yet another embodiment, and with reference to FIG. 1B, aggregator 130 may reside be situated off-site (e.g., not as customer premises equipment) and may serve one or more premises 120.

The number of devices and configuration in environment 100 is exemplary and provided for simplicity. In practice, environment 100 may include more devices, different devices, and/or differently arranged devices, than those illustrated in FIG. 1A and FIG. 1B. Additionally, or alternatively, according to other embodiments, topologies other than client/server may be used, such as, for example, peer-to-peer, etc. Additionally, according to other embodiments, some functions described as being performed by a particular device may be performed by a different device or a combination of devices.

Environment 100 may include wired and/or wireless connections among the devices illustrated. Core network 105 may correspond to a network that provides various services to customers/subscribers. By way of example, core network 105 may include a wireless network (e.g., a mobile network, a cellular network, a non-cellular network, etc.), such as, for example, a Global System for Mobile Communications (GSM) network, a Universal Mobile Telecommunication System (UMTS) network, a Wideband Code Division Multiple Access (WCDMA) network, an Ultra Mobile Broadband (UMB) network, a High-Speed Packet Access (HSPA) network, a Worldwide Interoperability for Microwave Access (WiMAX) network, a wide area network (WAN), the Internet, a telephone network, such as a Public Switched Telephone Network (PSTN) or a Public Land Mobile Network (PLMN), a data network, a private network, etc., or a wired network (e.g., an optical network, a coaxial network, etc.), such as, for example, a broadband network, a television network, etc.

Application server 110 may include a device that provides services with respect to clients 125. For example, application server 110 may, among other things, obtain readings from application client 125 regarding usage and delivery of services, such as, for example, gas, electric, and/or water.

Wireless node 115 may include a device that wirelessly communicates with application client 125 and/or aggregator 130. For example, wireless node 115 may correspond to an evolved Node B (eNB), a base station (BS), a base station controller (BSC), a Node B, a base transceiver station (BTS), a relay node, a repeater, a home eNB (HeNB), a home node B (HNB), a radio node, etc. Wireless node 115 may support one access and/or wireless technology or multiple access and/or wireless technologies.

Figure 1B:
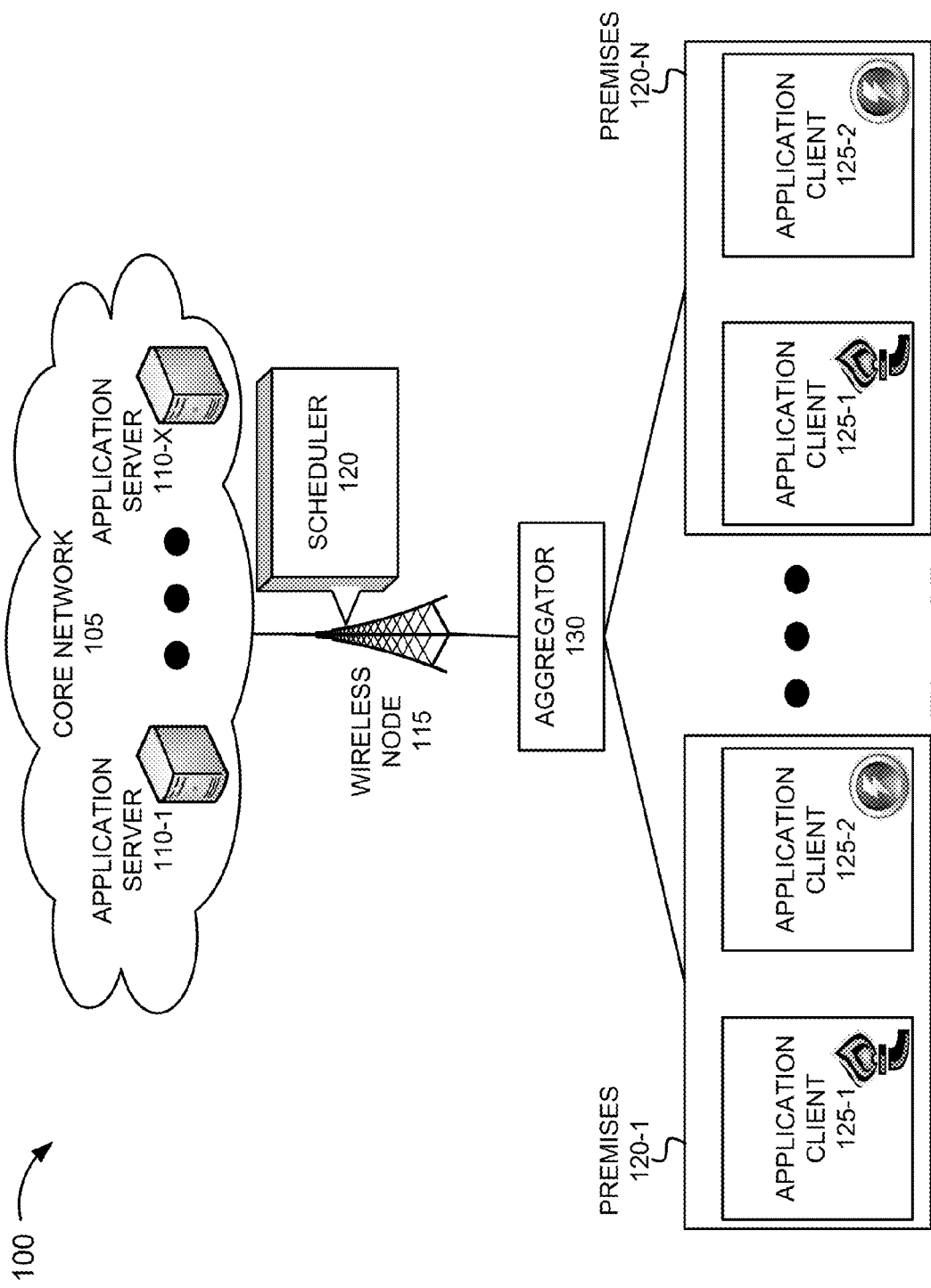
FIG. 1B is a diagram illustrating another exemplary environment in which an exemplary embodiment of a single/multiple time-domain(s) water-filling-weighted pseudo-random task scheduling may be implemented.

Scheduler 120 may schedule the execution of machine-to-machine tasks based on a single time-domain water-filling-weighted pseudo-random task scheduling process or multiple time-domain(s) water-filling-weighted pseudo-random task scheduling process, as described further below. According to an exemplary embodiment, as illustrated in FIGS. 1A and 1B, wireless node 115 may include scheduler 120. According to other exemplary embodiments, scheduler 120 may reside in a different node of an access network or within a device residing in core network 105.

Premises 120 may correspond to a customer site. For example, premises 120 may correspond to a residential, a commercial, or an industrial location that is receiving services, such as, for example, gas, electric, and/or water. Application client 125 may communicate with application server 110 relating to services, such as, for example, gas, electric, and/or water. According to an exemplary implementation, a metering device (e.g., a gas meter, a water meter, an electric meter) may include application client 125. According to another exemplary implementation, application client 125 may correspond to a device/component that does not reside in the metering device.

Aggregator 130 may collect/distribute information from/to multiple application clients 125 with respect to one or multiple premises 120. As illustrated in FIG. 1A, according to an exemplary implementation, aggregator 130 may reside on premises 120. For example, according to an exemplary implementation, aggregator 130 may be implemented within a box, a pedestal, or some other customer premise equipment. According to other implementations, as illustrated in FIG. 1B, aggregator 130 may reside off-premises 120. For example, according to an exemplary implementation, aggregator 130 may be implemented as an intermediary node (e.g., a gateway, a base station, a wireless node, etc.) between application clients 125 and wireless node 115.

Figure 1C:
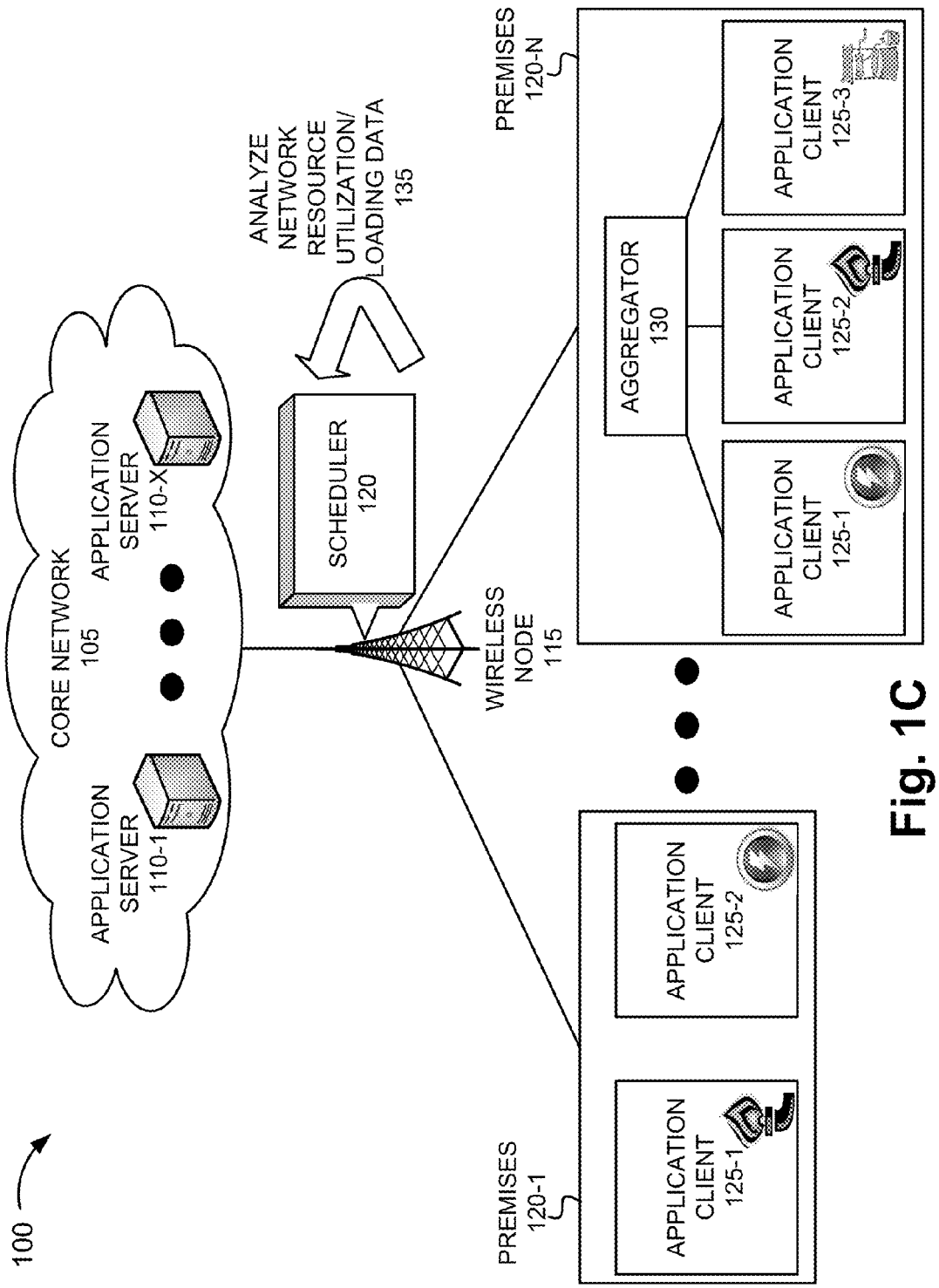
FIGS. 1C-1G are diagrams illustrating exemplary processes associated with a single/multiple time-domain(s) water-filling-weighted pseudo-random task scheduling.

FIGS. 1C-1G are diagrams illustrating exemplary processes associated with a single/multiple time-domain(s) water-filling-weighted pseudo-random task scheduling. Referring to FIG. 1C, as illustrated, scheduler 120 may analyze network resource utilization/traffic loading 135 with respect to network traffic to/from core network 105. For example, the network traffic may correspond to voice traffic, data traffic, or other types of traffic except the machine-to-machine traffic. Scheduler 120 may generate network resource usage patterns according to one or multiple time domains (e.g., monthly, weekly, etc.) based on historical data associated with the network traffic.

Figure 1D:
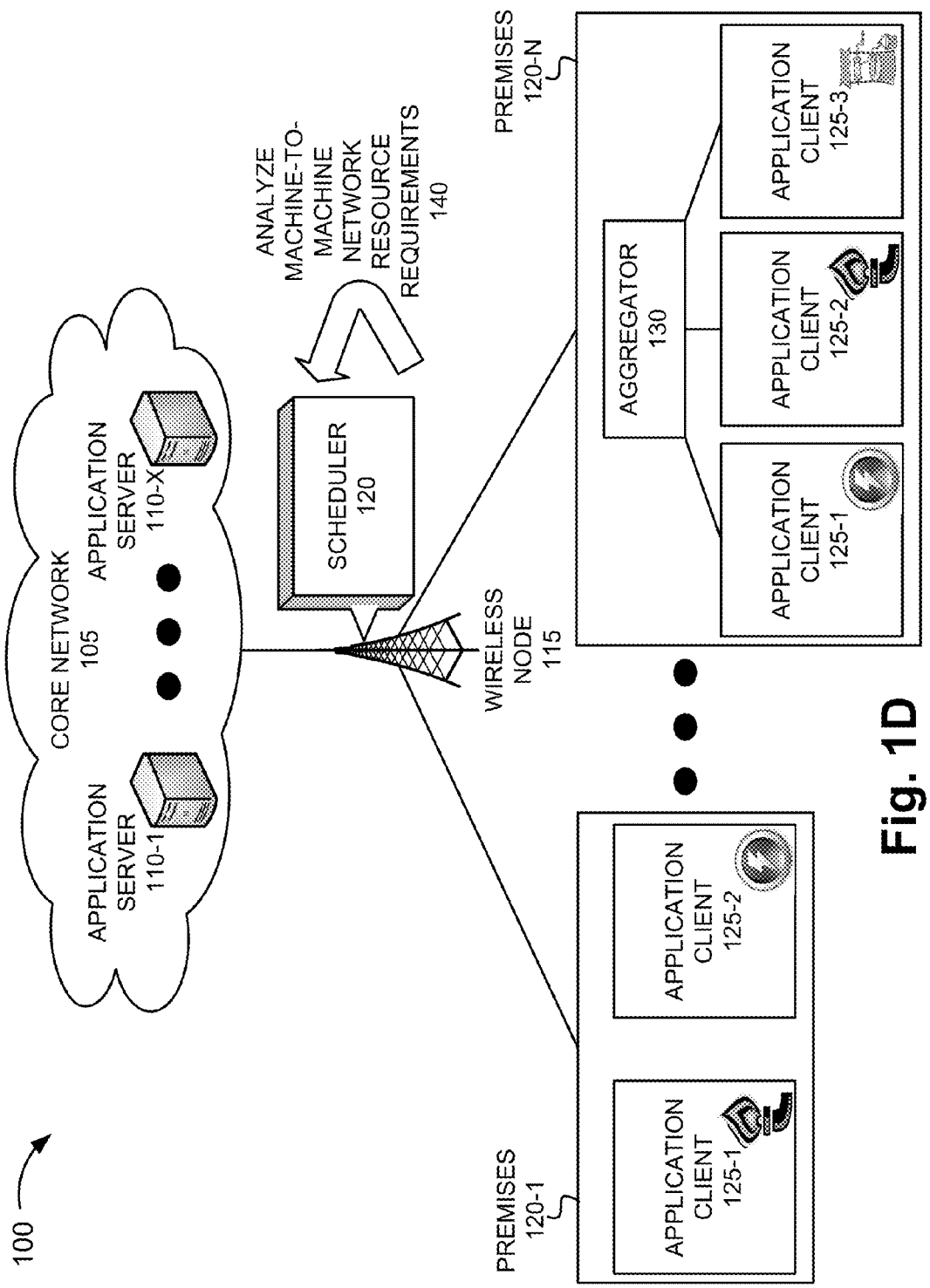
Figure 1E:
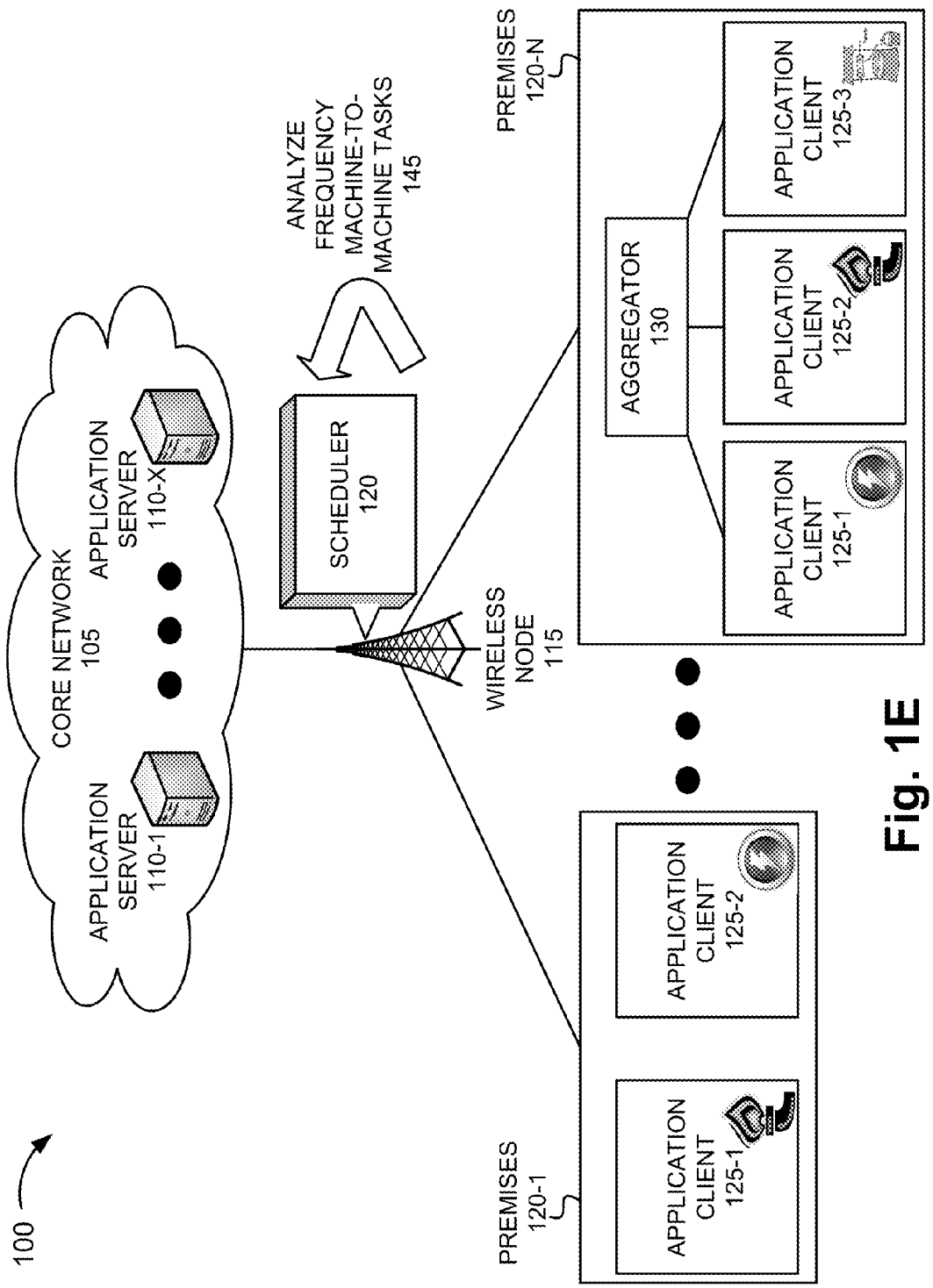

Referring to FIG. 1D, scheduler 120 may analyze machine-to-machine network resource requirements 140. For example, scheduler 120 may receive network resource requirements associated with machine-to-machine tasks from application client 125/aggregator 130 (e.g., within a resource request to wireless node 115), human input (e.g., application administrator, network administrator), or historical data. Scheduler 120 may analyze the frequency in which the machine-to-machine tasks 145 are to be performed, as illustrated in FIG. 1E. Scheduler 120 may determine the time domains for the execution of the machine-to-machine tasks based on the frequencies in which the machine-to-machine tasks are to be performed.

Figure 1F:
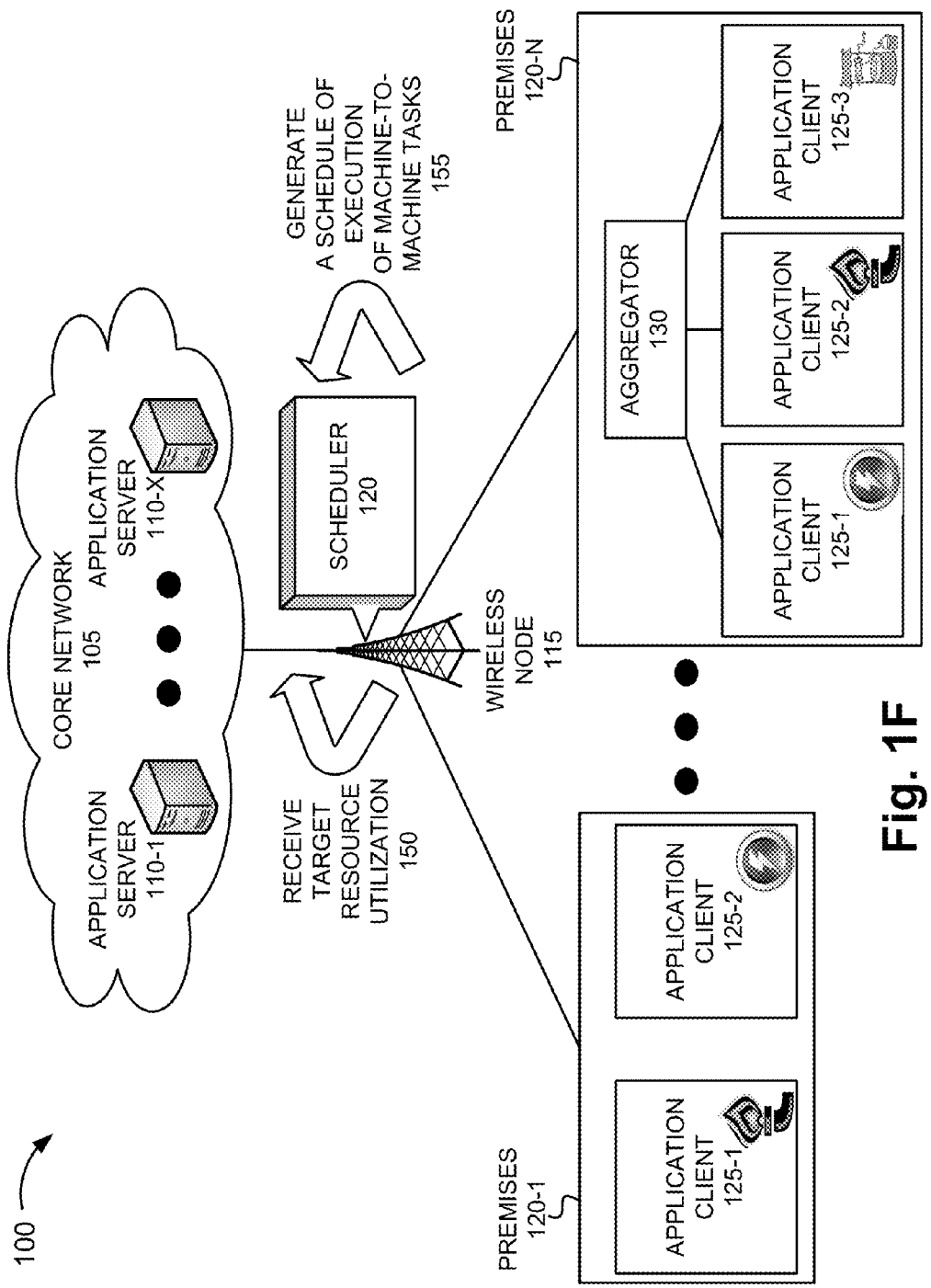
Figure 1G:
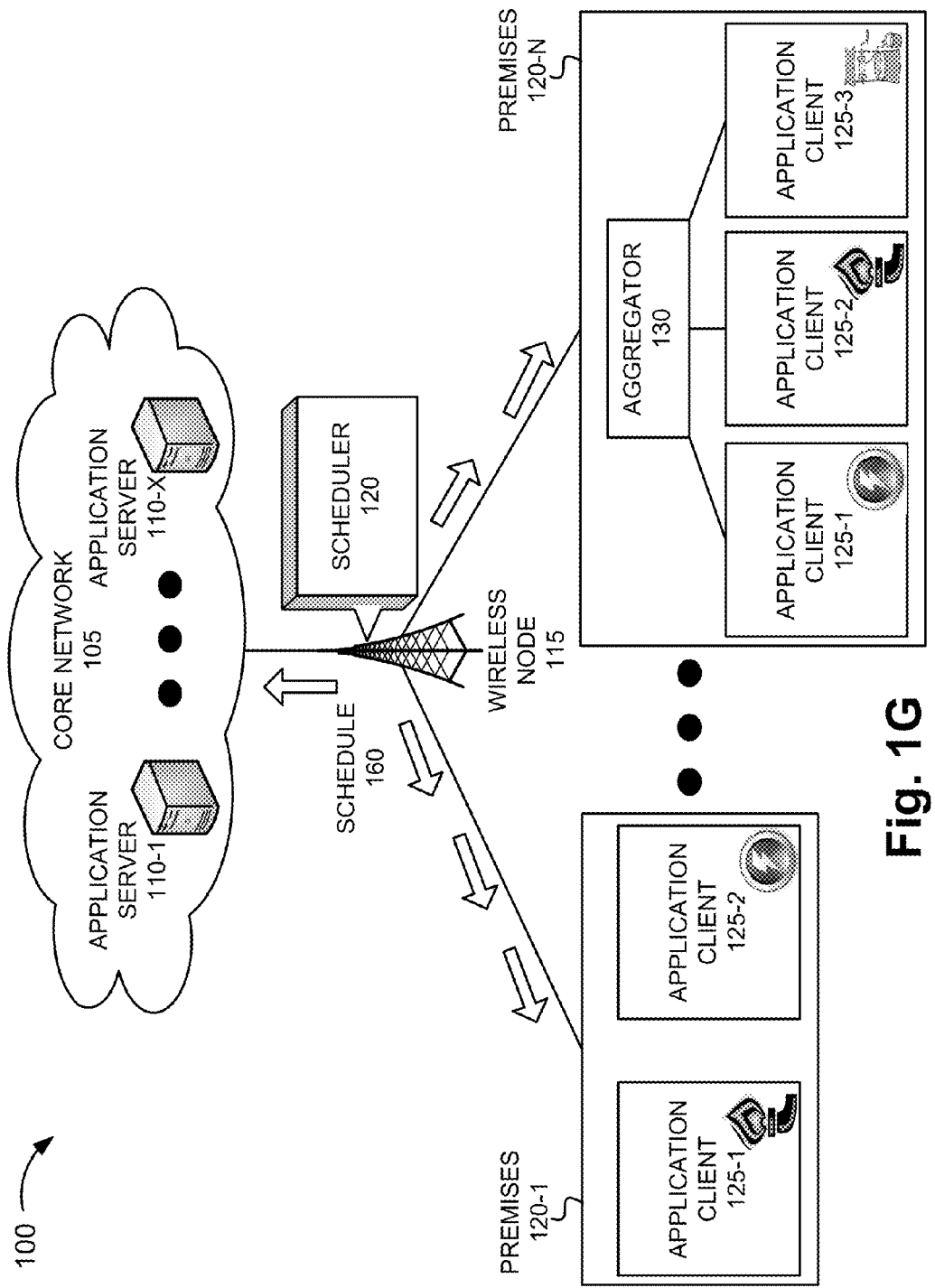

Referring to FIG. 1F, scheduler 120 may receive a target resource utilization 150. Based on the target resource utilization, scheduler 120 may generate a schedule for execution of the machine-to-machine tasks 155. For example, as previously described, and as will be described further below, according to an exemplary implementation, scheduler 120 may calculate probabilities of assigning the machine-to-machine tasks to the time slots based on the difference between the target resource utilization value(s) and the network resource utilization and traffic loading. Additionally, for example, a pseudo-random, uniformly distributed number generator may be used to calculate a pdf based on an i.i.d.

random variable. The pseudo-random, uniformly distributed number generator may be used to select the time slot in which the machine-to-machine tasks may be randomly executed. As illustrated in FIG. 1G, scheduler 120 may provide a schedule 160 to application server 110, application client 125-1, and/or aggregator 130. The machine-to-machine tasks may be executed based on schedule 160.

As a result of the foregoing, machine-to-machine tasks may be efficiently managed based on the single/multiple time-domain(s) water-filling-weighted pseudo-random task scheduling. In this way, the likelihood of network resource utilization/traffic loading associated with machine-to-machine tasks causing network problems (e.g., congestion, etc.) may be reduced. Since an exemplary embodiment has been broadly described, a more detailed description is provided below, along with various implementations.

FIG. 2 is a diagram illustrating exemplary components of a device 200 that may correspond to one or more of the devices in environment 100. For example, device 200 may correspond to application server 110, scheduler 120, wireless node 115, application client 125, aggregator 130, or another type of network device that may include scheduler 120. As illustrated, device 200 may include a processing system 205, memory/storage 210 including applications 215, a communication interface 220, an input 225, and an output 230. According to other implementations, device 200 may include fewer components, additional components, different components, and/or a different arrangement of components than those illustrated in FIG. 2 and described herein.

Processing system 205 may include one or multiple processors, microprocessors, data processors, co-processors, application specific integrated circuits (ASICs), controllers, programmable logic devices, chipsets, field programmable gate arrays (FPGAs), application specific instruction-set processors (ASIPs), system-on-chips (SOCs), and/or some other component that may interpret and/or execute instructions and/or data. Processing system 205 may control the overall operation or a portion of operation(s) performed by device 200. Processing system 205 may perform one or more operations based on an operating system and/or various applications (e.g., applications 215).

Processing system 205 may access instructions from memory/storage 210, from other components of device 200, and/or from a source external to device 200 (e.g., a network or another device).

Memory/storage 210 may comprise one or multiple memories and/or one or multiple secondary storages. For example, memory/storage 210 may comprise a random access memory (RAM), a dynamic random access memory (DRAM), a read only memory (ROM), a programmable read only memory (PROM), a flash memory, and/or some other type of memory. Memory/storage 210 may include a hard disk (e.g., a magnetic disk, an optical disk, a magneto-optic disk, a solid state disk, etc.) or some other type of computer-readable medium, along with a corresponding drive. Memory/storage 210 may include a memory and/or a secondary storage that is external to and/or removable from device 200, such as, for example, a Universal Serial Bus (USB) memory, a dongle, a hard disk, mass storage, off-line storage, etc.

The term "computer-readable medium," as used herein, is intended to be broadly interpreted to comprise, for example, a memory, a secondary storage, a compact disc (CD), a digital versatile disc (DVD), or the like. The computer-readable medium may be implemented in a single device, in multiple devices, in a centralized manner, or in a distributed manner. Memory/storage 210 may store data, application(s), and/or instructions related to the operation of device 200.

Memory/storage 210 may store data, applications 215, and/or instructions related to the operation of device 200. For example, with reference to application server 110, applications 215 may include one or multiple applications for providing services, obtaining readings, etc., regarding the usage and delivery of services, such as, for example, gas, electric, and/or water. Additionally, or alternatively, with reference to wireless node 115, applications 215 may include one or multiple applications to perform one or more processes associated with scheduler 120, as described herein. Additionally, or alternatively, with reference to application client 125 and aggregator 130, applications 215 may include one or multiple applications to perform one or more processes associated with application client 125 and aggregator 130, as described herein.

Communication interface 220 may permit device 200 to communicate with other devices, networks, and/or systems, or the like. Communication interface 220 may include a wireless interface and/or a wired interface. Communication interface 220 may include a transmitter, a receiver, and/or a transceiver. Communication interface 220 may operate according to various protocols, standards, and the like.

Input 225 may permit an input into device 200. For example, input 225 may include a keyboard, a mouse, a microphone, a display, a touchpad, a button, a switch, an input port, and/or some other type of input component.

Output 230 may permit an output from device 200. For example, output 230 may include a speaker, a display, one or more light emitting diodes (LEDs), an output port, and/or some other type of output component.

As described herein, device 200 may perform processes in response to processing system 205 executing software instructions (e.g., applications 215) contained in a computer-readable medium, such as memory/storage 210. By way of example, the software instructions may be read into memory/storage 210 from another computer-readable medium or from another device via communication interface 220. The software instructions stored in memory/storage 210 may cause processing system 205 to perform processes described herein. Alternatively, device 200 may perform processes based on hardware (processing system 205, etc.), hardware and firmware, and/or hardware, software, and firmware.

As previously described, according to an exemplary embodiment, machine-to-machine tasks may be scheduled based on a single/multiple time-domain(s) water-filling-weighted pseudo-random task scheduling process. For example, scheduler 120 may perform the single/multiple time-domain(s) water-filling-weighted pseudo-random task scheduling process. FIGS. 3A-3F are diagrams illustrating an exemplary process associated with scheduler 120 for generating a schedule for executing machine-to-machine tasks based on the single/multiple time-domain(s) water-filling-weighted pseudo-random task scheduling process. Scheduler 120 may be implemented in hardware (e.g., processing system 205, etc.), software, hardware and software (e.g., applications 215), or hardware, software, and firmware based on the components illustrated and described with respect to FIG. 2.

Figure 3A:
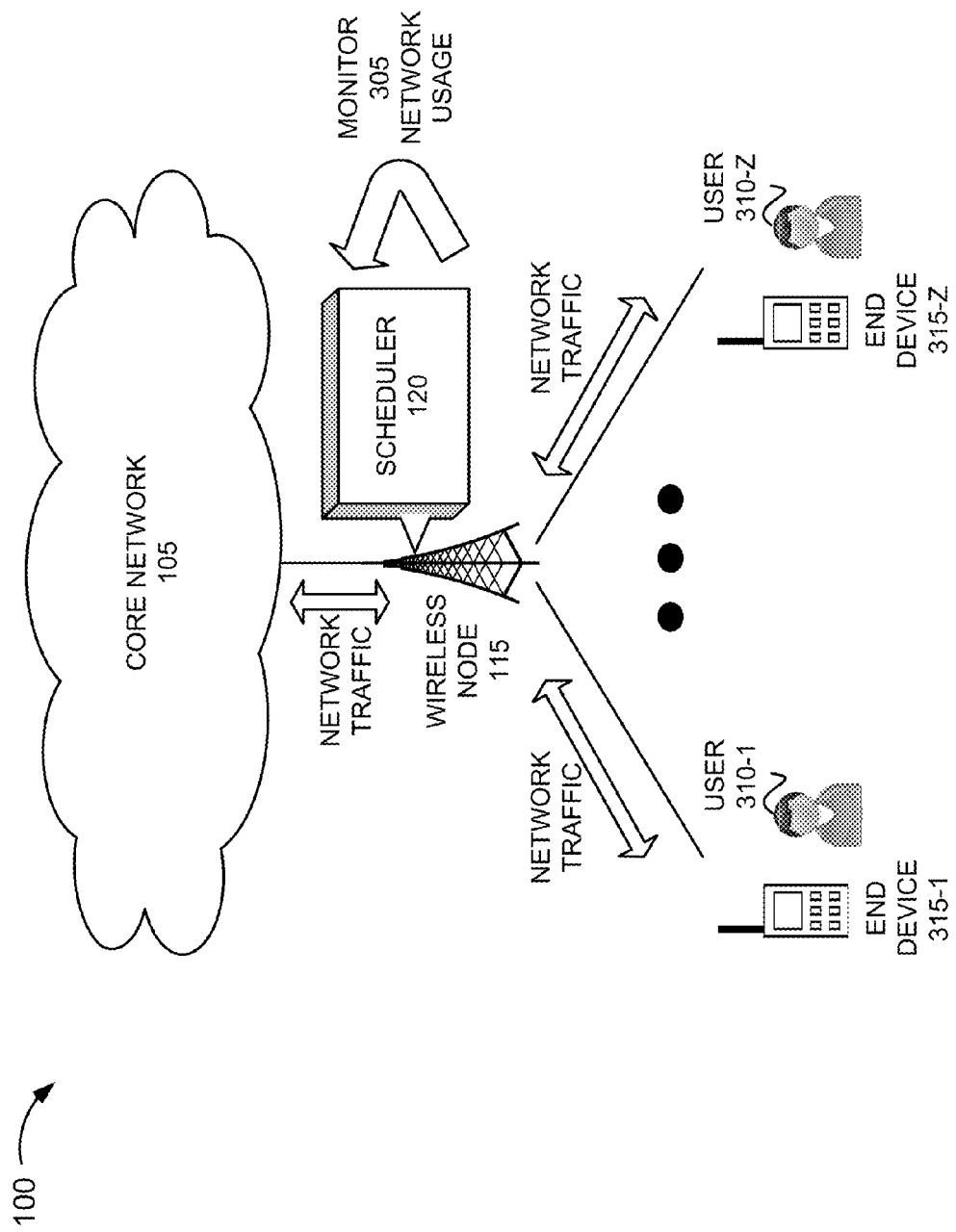
Figure 3B:
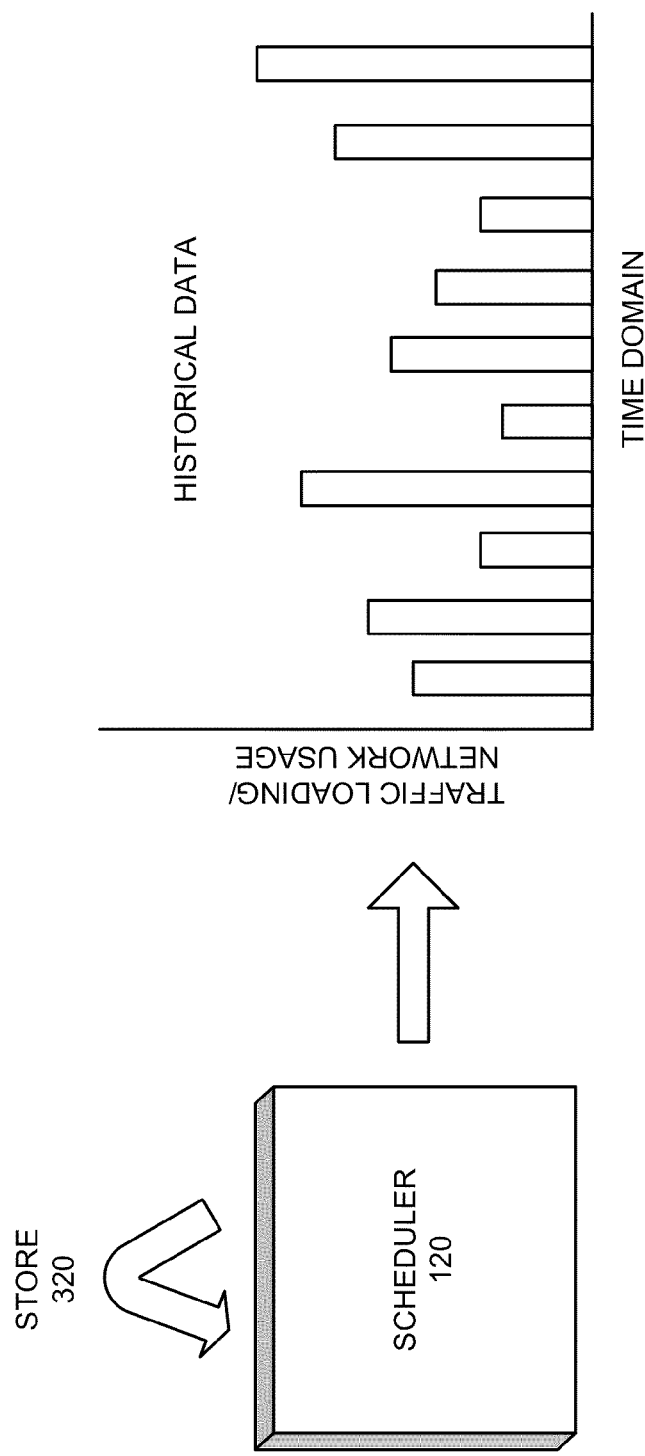

Referring to FIG. 3A, according to an exemplary implementation, scheduler 120 may monitor 305 traffic loading and network usage with respect to network traffic to/from core network 105 and to/from end devices 315-1 through 315-Z associated with users 310-1 through 310-Z. Scheduler 120 may also receive traffic loading/network usage data from other nodes in environment 100. As illustrated in FIG. 3B, scheduler 120 may store 320 historical data associated with the traffic loading and network usage in accordance with one or multiple time domains (e.g., monthly, weekly, daily, etc.) and time slots thereof (e.g., hourly, half-hourly, minutes, etc.). For example, scheduler 120 may calculate network resource usage value(s) based on statistical analysis of the traffic loading/network usage data.

Figure 3C:
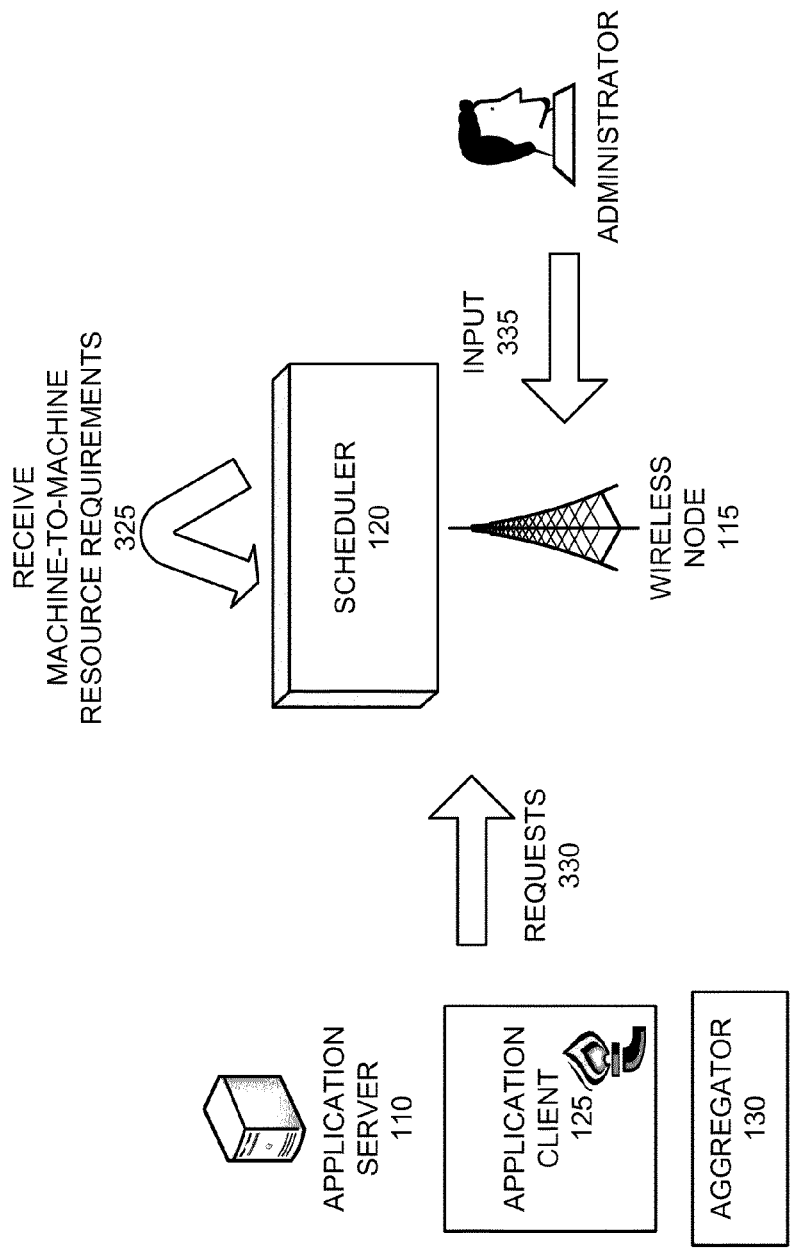

Referring to FIG. 3C, scheduler 120 may receive machine-to-machine resource requirements 325. By way of example, scheduler 120 may receive machine-to-machine resource requirements based on requests 330 (e.g., resource requests) from application server 110, application client 125, and/or aggregator 130 to wireless node 115, human input 335 (e.g., from an administrator), and/or historical data. As illustrated in FIG. 3D, scheduler 120 may analyze machine-to-machine resource requirements 340 and the frequency of machine-to-machine tasks. Scheduler 120 may determine the time domains for the execution of the machine-to-machine tasks based on the frequencies in which the machine-to-machine tasks are to be performed.

As further illustrated in FIG. 3D, a target resource utilization (e.g., value(s)) may be defined (e.g., by a network administrator) for each time domain and/or time slot thereof. The network administrator may define the time domain(s) and/or time slot(s) based on the machine-to-machine task requirements, etc. The target resource utilization may correspond to a network resource limit with which network resources may be utilized. Based on the target resource utilization and the traffic loading and the network usage associated with the network, scheduler 120 may determine available network resources associated with particular time domain(s) and/or time slot(s). For example, as previously described, no machine-to-machine task(s) may be assigned to a time slot in which traffic loading/resource utilization is higher than the target resource utilization. Conversely, machine-to-machine task(s) may be assigned to a time slot in which traffic loading/resource utilization is lower than the target resource utilization. For example, as illustrated in FIG. 3D, A1-A(N) represent available network resources.

Figure 3E:
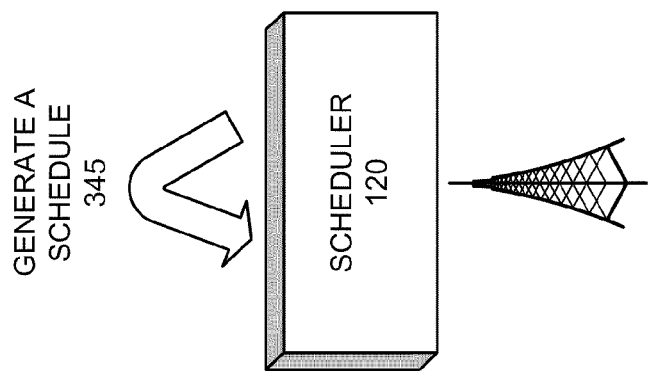

Referring to FIG. 3E, scheduler 120 may generate a schedule 345 based on the information described above. For example, according to an exemplary embodiment, scheduler 120 may calculate probabilities for assigning machine-to-machine tasks to a time domain/time slot according to the following exemplary expression:

$$P\{\text{task assigned to time slot } n\} = \begin{cases} \dfrac{A_n}{\sum_{i=1, A_i>0}^{i=N} A_i}, & \text{if } A_n > 0 \\ 0 & \text{if } A_n = 0 \end{cases}$$

where $A_i$ is defined as $$A_i = \begin{cases} U_T - U_i, & \text{if } U_T \geq U_i \\ 0 & \text{if } U_T < U_i \end{cases}$$

and where $U_i$ is the traffic loading/resource utilization of time slot i, and $U_T$ is the target resource utilization. The target loading/resource utilization may be set by, for example, a network administrator to trade-off between the network utilization and outage probability (e.g., overloading, etc.). That is, a high target resource utilization value $U_T$ may improve network utilization, while concurrently increasing an outage risk, and vice versa. The term $A_n$ represents the resources available (i.e. as defined by $U_T - U_i$) for time slot n.

According to an exemplary embodiment, scheduler 120 may use a uniformly distributed pseudo-random number generator to calculate a uniform pdf. For example, assume $P_x(x)$ is i.i.d., in which $x \in [0,1]$ is the uniform pdf, such that if $$\dfrac{\sum_{j=1}^{n} A_{j-1}}{\sum_{i=1, A_i>0}^{N} A_i} \leq x < \dfrac{\sum_{j=1}^{n} A_j}{\sum_{i=1, A_i>0}^{N} A_i},$$

the machine-to-machine task is assigned to time slot $n \in [1, N]$, where N is the total number of time slots in the time domain and $A_0 = 0$. In this way, the pseudo-random, uniformly distributed number generator may select a time slot to execute the machine-to-machine task and the probability of the time slot selected may correspond to the pdf calculated.

According to an exemplary implementation, once machine-to-machine tasks are assigned to particular time divisions (i.e., time slots), the machine-to-machine tasks may be scheduled to be executed randomly. Additionally, as previously described, the pseudo-random, uniformly distributed number generator may be used to randomize the execution of machine-to-machine tasks assigned to the same time slot. For example, if scheduler 120 assigns the execution of machine-to-machine tasks based on an hourly time domain, the pseudo-random number generator may be used to assign the execution of the machine-to-machine tasks to a finer time precision (e.g., minutes, seconds, or some other machine time unit (e.g., chips, etc.)).

For multiple time-domains scheduling, scheduler 120 may generate a schedule in an iterative manner. For example, a two time-domain (e.g., any day within the second week of the month and between 9 p.m. and 9 a.m.) water-filling-weighted pseudo-random task scheduling process may be implemented. According to an exemplary implementation, scheduler 120 may select a day (e.g., Wednesday) using the single time-domain water-filling-weighted pseudo-random task scheduling process described herein. Thereafter, scheduler 120 may analyze the traffic loading/resource utilization according to an hourly time domain (e.g., between 9 p.m. and 9 a.m.) for Wednesday. Scheduler 120 may assign machine-to-machine task(s) to be executed within a particular hour using the single time-domain water-filling-weighted pseudo-random task scheduling process.

Figure 3F:
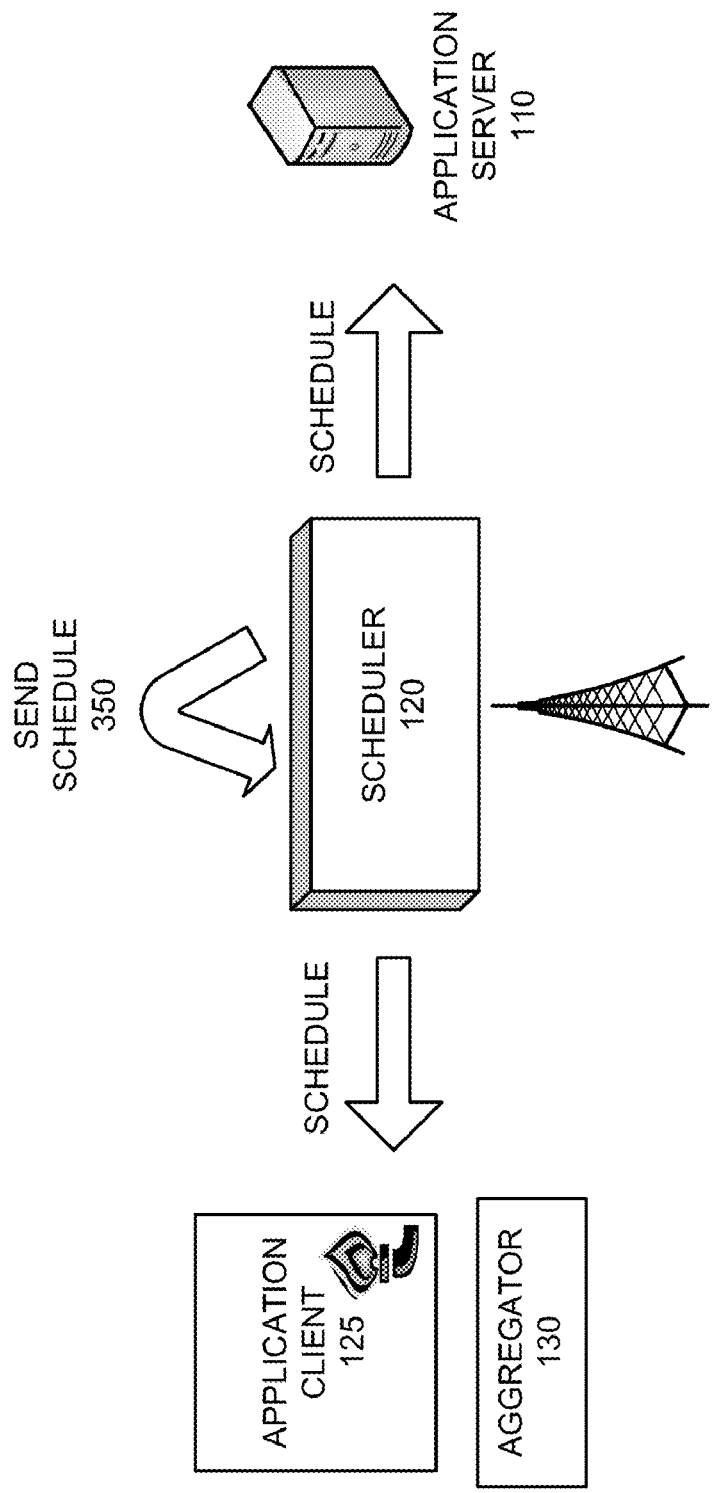

Referring to FIG. 3F, once a schedule has been generated for the machine-to-machine tasks, scheduler 120 may send the schedule 350 to application server 110, application client 125, and/or aggregator 130.

Figure 4:
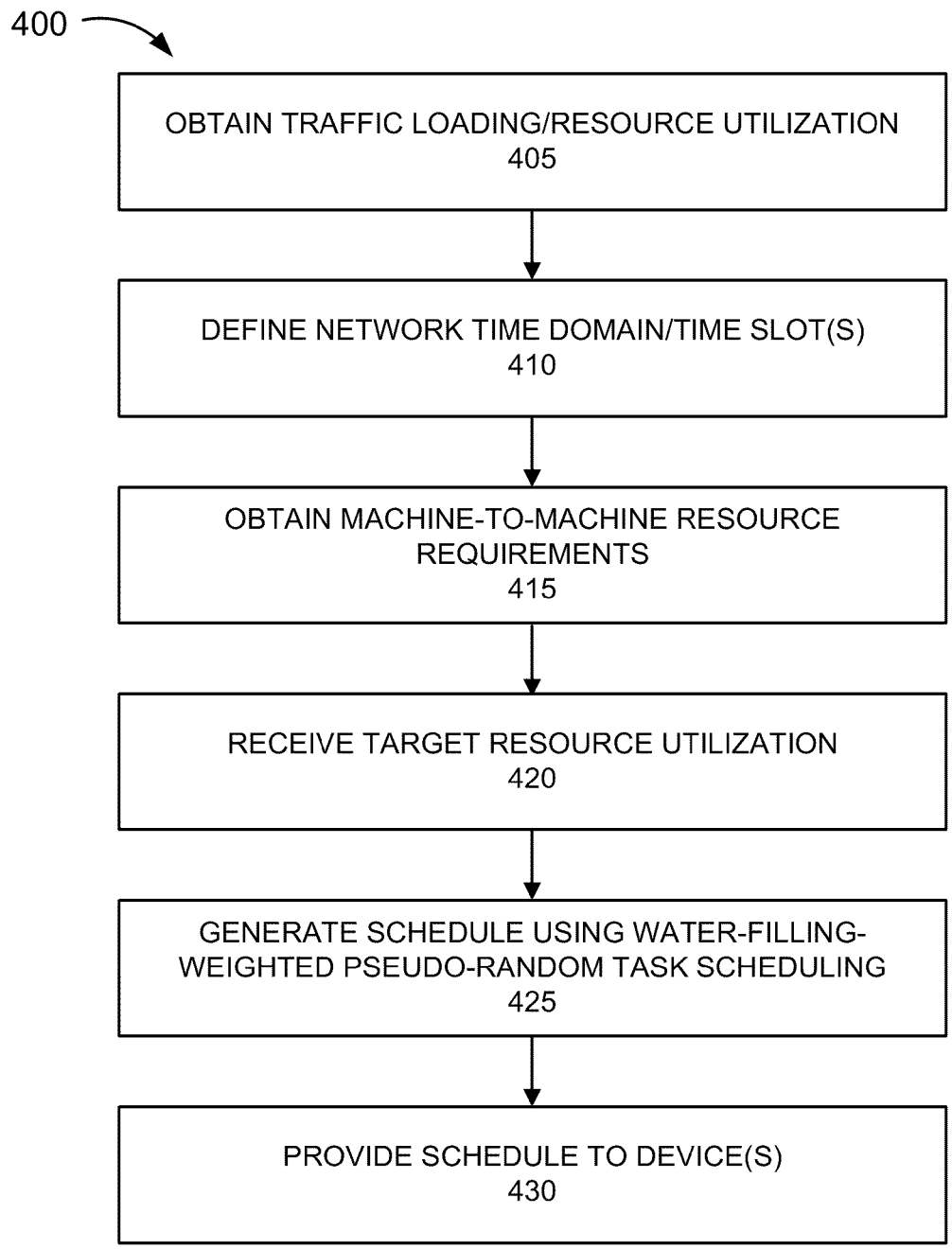
FIG. 4 is a flow diagram illustrating an exemplary process for providing a single time-domain water-filling-weighted pseudo-random task scheduling.

FIG. 4 is a flow diagram illustrating an exemplary process 400 for providing single time-domain water-filling-weighted pseudo-random task scheduling. According to an exemplary implementation, process 400 may be performed by wireless node 115 (e.g., scheduler 120). According to other implementations, scheduler 120 may be implemented within a device other than wireless node 115, within a combination of devices, within other topologies, etc.

Process 400 may include obtaining traffic loading/resource utilization associated with a network (block 405). For example, as previously described, scheduler 120 may monitor traffic loading and network usage with respect to network traffic and/or receive traffic loading and network usage from other nodes of the network. The traffic loading and network usage may relate to end-to-end communications and/or portions thereof. The traffic loading and network usage may be associated with an access network and/or a core network.

Network time domain/time slot(s) may be defined (block 410). For example, as previously described, scheduler 120 may analyze the traffic loading and network usage with respect to the network traffic based on a time domain and/or time division(s) of the time domain (e.g., time slot(s)) specified. For example, a time domain may correspond to a monthly time period, a weekly time period, a daily time period, etc. A time slot may correspond to, for example, hourly, minutes, seconds, etc., or some other type of time division of the time domain. According to other implementations, the time domain may be of such a small time resolution that time slot(s) may not be used and/or may be equivalent to the desired time slot(s).

Machine-to-machine resource requirements may be obtained (block 415). For example, as previously described, scheduler 120 may obtain machine-to-machine resource requirements. By way of example, scheduler 120 may receive resource requests from devices (e.g., machine devices), resource requirement data from an administrator, and/or use historical data associated with machine-to-machine communications.

A target resource utilization value(s) may be received (block 420). For example, as previously described, a target resource utilization of the network may be specified (e.g., by a network operator, administrator, etc.). The target resource utilization may correspond to a resource limit with which network resource may be utilized.

A schedule may be generated (block 425). For example, as previously described with respect to FIG. 3E and elsewhere in this description, scheduler 120 may generate a schedule for the execution of machine-to-machine tasks based on a time-domain water-filling-weighted pseudo-random task scheduling process.

The schedule may be provided to device(s) (block 430). For example, as previously described, scheduler 120 may provide the schedule to machine device(s) (e.g., application server 110, application client 125, and/or aggregator 130). Application server 110, application client 125, and/or aggregator 130 may execute machine-to-machine tasks based on the schedule.

Although FIG. 4 illustrates an exemplary process 400 according to other implementations, process 400 may include additional operations, fewer operations, and/or different operations than those illustrated in FIG. 4 and described herein.

Additionally, as previously described, multiple time-domains water-filling-weighted pseudo-random task scheduling may be performed when multiple time domains are specified. In this way, a single time-domain water-filling-weighted pseudo-random task scheduling process may be iteratively performed for multiple time domains.

Figure 5:
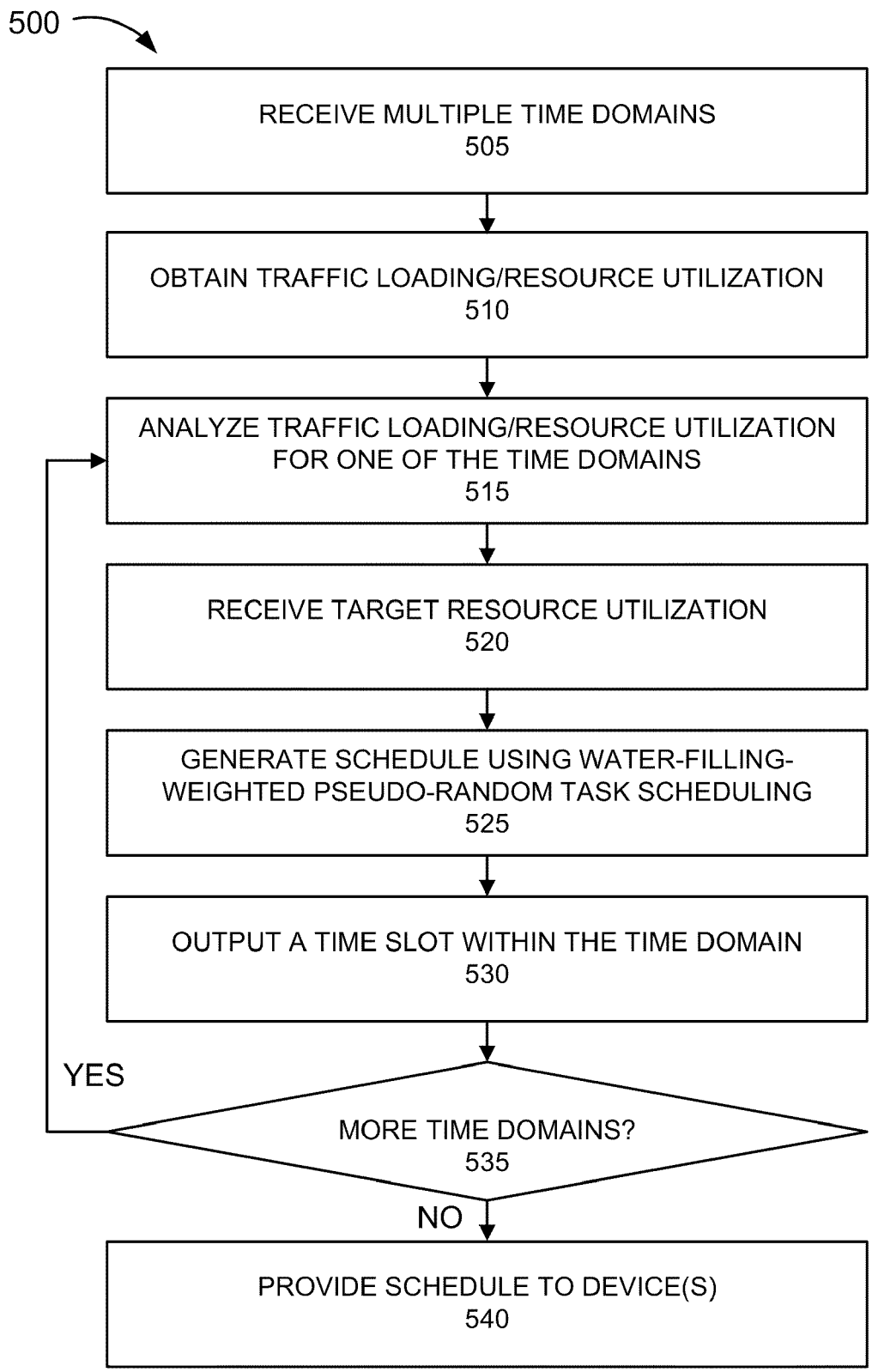
FIG. 5 is a flow diagram illustrating an exemplary process for providing multiple time domains water-filling-weighted pseudo-random task scheduling.

FIG. 5 a flow diagram illustrating an exemplary process 500 for providing multiple time-domains water-filling-weighted pseudo-random task scheduling. For example, one may have one task or multiple tasks that one wishes to execute within a window of time. Multiple time domains of differing time resolutions may be used.

According to an exemplary implementation, process 500 may be performed by wireless node 115 (e.g., scheduler 120). According to other implementations, scheduler 120 may be implemented within a device other than wireless node 115, within a combination of devices, within other topologies, etc.

Process 500 may include receiving multiple time domains (block 505). For example, scheduler 120 may receive multiple time domains (e.g., a two week time period, an hourly time period, a daily time period, etc.).

Traffic loading/resource utilization associated with a network may be obtained (block 510). For example, as previously described, scheduler 120 may monitor traffic loading and network usage with respect to network traffic and/or receive traffic loading and network usage from other nodes of the network. The traffic loading and network usage may relate to end-to-end communications and/or portions thereof. The traffic loading and network usage may be associated with an access network and/or a core network.

Traffic loading/resource utilization may be analyzed based on one of the time domains (block 515). For example, as previously described, scheduler 120 may analyze the traffic loading a network usage with respect to the network traffic based on one of the time domains specified. By way of example, assume that traffic loading and network usage may be analyzed for a second week of the month.

Machine-to-machine resource requirements may be obtained (block 520). For example, as previously described, scheduler 120 may obtain machine-to-machine resource requirements. By way of example, scheduler 120 may receive resource requests from devices (e.g., machine devices), resource requirement data from an administrator, and/or use historical data associated with machine-to-machine communications.

A schedule may be generated (block 525) and a time slot within the time period may be output (block 530). For example, as previously described with respect to FIG. 3E and elsewhere in this description, scheduler 120 may generate a schedule for the execution of machine-to-machine tasks based on a time-domain water-filling-weighted pseudo-random task scheduling process. By way of example, within the second week of the month time domain period, scheduler 120 may select Tuesday as a time period in which one or multiple machine-to-machine tasks may be scheduled.

It may be determined whether another time domain is to be considered (block 535). For example, scheduler 120 may determine whether all of the time domains have been considered based on block 505. If it is determined that another time domain is to be considered (block 535-Yes), process 500 may continue to block 515. If it is determined that another time domain is not to be considered (block 535-No), the schedule may be provided to device(s) (block 540). By way of example, assume that another time domain corresponds to a time period between 9 pm and 9 am. In this case, process 500 may continue to block 515 and analyze the traffic loading and resource utilization for the selected day (i.e., Tuesday) and based on the second time domain (i.e., between 9 pm and 9 am). Process 500 may continue to blocks 520 through 535 in a manner similar to that previously described with respect to the first time domain. Scheduler 120 may select an hour (i.e., within the 9 pm-9 am time period) and within the first time domain (i.e., Tuesday) using time-domain water-filling-weighted pseudo-random task scheduling approach, as previously described.

Although FIG. 5 illustrates an exemplary process 500 according to other implementations, process 500 may include additional operations, fewer operations, and/or different operations than those illustrated in FIG. 5 and described herein.

The foregoing description of implementations provides illustration, but is not intended to be exhaustive or to limit the implementations to the precise form disclosed. Accordingly, modifications to the implementations described herein may be possible.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while series of blocks have been described with regard to the processes illustrated in FIG. 4 and FIG. 5, the order of the blocks may be modified in other implementations. Further, non-dependent blocks may be performed in parallel. Additionally, other processes described in this description may be modified and/or non-dependent operations may be performed in parallel.

It will be apparent that the embodiments described herein may be implemented in many different forms of software or firmware in combination with hardware in the implementations illustrated in the figures. The actual software code (executable by hardware) or specialized control hardware used to implement the device, method, and/or system does not limit the disclosure of the invention. Thus, the operation and behavior of the devices and/or systems, or the performing of the methods was described without reference to the specific software code—it being understood that software and control hardware can be designed to implement the device, method, and/or system based on the description herein.

Further certain features described above may be implemented as "logic" or a "component" that performs one or more functions. This logic or component may include hardware (e.g., processing system 205, etc.), software, a combination of hardware and software (e.g., applications 215), a combination of hardware and firmware, or a combination of hardware, firmware, and software.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. For example, although particular pdfs and water-filling pseudo-random task scheduling has been described, according to other implementations, other pdfs and/or task scheduling algorithms may be used. The specification and drawings are accordingly to be regarded as illustrative rather than restrictive. No element, act, or instruction used in the present application should be construed as critical or essential to the implementations described herein unless explicitly described as such.

What is claimed is:

1. A method comprising:
obtaining, by a device, traffic loading and resource utilization information associated with a network for a network time domain;
obtaining, by the device, machine-to-machine resource requirements for machine-to-machine tasks using the network;
receiving, by the device, a target resource utilization value indicative of a network resource limit for the network time domain;
calculating, by the device, a probability for assigning each machine-to-machine task to the network time domain, wherein the probability is based on a difference between the target resource utilization value and the traffic loading and resource utilization associated with the network;
calculating, by the device, a uniformly-distributed probability density function based on an independent and identically distributed random variable;
generating, by the device, a schedule of execution of the machine-to-machine tasks with respect to the network time domain based on the probabilities associated with the machine-to-machine tasks and the uniformly-distributed probability density function; and
providing, by the device to other devices, the schedule of execution of the machine-to-machine tasks.

2. The method of claim 1, further comprising:
dividing the network time domain into time slots, wherein the time slots correspond to time periods smaller than the network time domain; and
generating the schedule of execution based on the time slots.

3. The method of claim 2, wherein the calculating the probability is based on a ratio between the difference between the target resource utilization value and the traffic loading and resource utilization for one of the time slots and a summation of the difference between the target resource utilization value and the traffic loading and resource utilization with respect to the time slots.

4. The method of claim 3, further comprising:
determining one or more machine-to-machine time domains based on a frequency associated with the machine-to-machine tasks.

5. The method of claim 2, wherein the calculating the probability comprises:
calculating the probability to be zero when the target resource utilization value is less than the traffic loading and resource utilization with respect to one of the time slots.

6. The method of claim 1, further comprising:
assigning a machine-to-machine task to a time slot of the network time domain based on the probability associated with the machine-to-machine task and an equivalence of the probability to the uniformly-distributed probability density function;
receiving another network time domain;
calculating another probability for assigning each machine-to-machine task to the other network time domain; and
generating the schedule of execution of the machine-to-machine tasks with respect to the other network time domain based on probabilities associated with the machine-to-machine tasks and a uniformly-distributed probability density function.

7. The method of claim 1, wherein when generating the schedule of execution, a plurality of machine-to-machine tasks assigned to a same network time domain are scheduled to execute randomly within the same network time domain.

8. The method of claim 1, further comprising:
executing the machine-to-machine tasks based on the schedule of execution.

9. A device comprising:
a communication interface;
a memory to store instructions; and
a processor to execute the instructions to:
obtain traffic loading and resource utilization information associated with a network for a network time domain;
obtain machine-to-machine resource requirements for machine-to-machine tasks using the network;
receive a target resource utilization value indicative of a network resource limit for the network time domain;
calculate a probability for assigning each machine-to-machine task to the network time domain, wherein the probability is based on a difference between the target resource utilization value and the traffic loading and resource utilization associated with the network;

calculate a probability density function based on an independent and identically distributed random variable;

generate a schedule of execution of the machine-to-machine tasks within a time period of the network time domain based on the probabilities associated with the machine-to-machine tasks and the probability density function; and provide, via the communication interface, the schedule of execution of the machine-to-machine tasks to one or more other devices.

10. The device of claim 9, wherein the device includes a wireless node associated with an access network.

11. The device of claim 9, wherein the processor to further execute the instructions to:

divide the network time domain into time slots, wherein the time slots correspond to time periods smaller than the network time domain; and generate the schedule of execution based on the time slots.

12. The device of claim 11, wherein the processor to further execute the instructions to:

assign a machine-to-machine task to at least one of the time slots based on the probability associated with the machine-to-machine task and an equivalence of the probability to the probability density function.

13. The device of claim 9, wherein the processor to further execute the instructions to:

calculate one or more resource usage values for the network time domain based on the traffic loading and resource utilization information.

14. The device of claim 9, wherein the difference between the target resource utilization value and the traffic loading and resource utilization associated with the network corresponds to available network resources, and when calculating the probability, the processor to further execute the instructions to:

calculate a ratio including available network resources for a time slot and a total of available network resources for all time slots.

15. The device of claim 9, wherein the processor to further execute the instructions to:

receive another network time domain;

calculate another probability for assigning each machine-to-machine task to the other network time domain; and generate the schedule of execution of the machine-to-machine tasks with respect to the network time domain and the other network time domain based on probabilities associated with the machine-to-machine tasks and a uniformly-distributed probability density function.

16. The device of claim 9, wherein the machine-to-machine tasks relate to utility services.

17. A non-transitory computer-readable medium storing instructions executable by at least one processor, the non-transitory computer-readable medium storing instructions to:

obtain traffic loading and resource utilization information associated with a network for a network time domain;

obtain machine-to-machine resource requirements for machine-to-machine tasks using the network;

receive a target resource utilization value indicative of a network resource limit for the network time domain;

calculate a probability for assigning each machine-to-machine task to the network time domain, wherein the probability is based on a difference between the target resource utilization value and the traffic loading and resource utilization associated with the network;

calculate a probability density function;

generate a schedule of execution of the machine-to-machine tasks within the network time domain based on the probabilities associated with the machine-to-machine tasks and the probability density function; and provide the schedule of execution of the machine-to-machine tasks to one or more devices.

18. The non-transitory computer-readable medium of claim 17, further storing one or more instructions to:

divide the network time domain into time slots, wherein the time slots correspond to time periods smaller than the network time domain; and generate the schedule of execution based on the time slots.

19. The non-transitory computer-readable medium of claim 17, further storing one or more instructions to:

assign a machine-to-machine task to at least one of the time slots based on the probability associated with the machine-to-machine task and an equivalence of the probability to the probability density function.

20. The non-transitory computer-readable medium of claim 19, wherein the computer-readable medium resides in a wireless node of an access network, and further storing one or more instructions to:

receive another network time domain;

calculate another probability for assigning each machine-to-machine task to the other network time domain; and generate the schedule of execution of the machine-to-machine tasks with respect to the other network time domain based on probabilities associated with the machine-to-machine tasks and a uniformly-distributed probability density function.

* * * * *